Feb. 12, 1952 P. POISSON-QUINTON 2,585,676
AIRCRAFT WING AND FLAP WITH BOUNDARY LAYER CONTROL
Filed July 29, 1948 6 Sheets-Sheet 1

INVENTOR
Philippe Poisson-Quinton
BY Brown & Jeward
ATTORNEYS

INVENTOR
Philippe Poisson-Quinton
BY Brown, Jaward
ATTORNEYS

Feb. 12, 1952     P. POISSON-QUINTON     2,585,676
AIRCRAFT WING AND FLAP WITH BOUNDARY LAYER CONTROL
Filed July 29, 1948     6 Sheets-Sheet 4

INVENTOR
Philippe Poisson-Quinton
By Brown & Jeward
ATTORNEYS

Patented Feb. 12, 1952

2,585,676

UNITED STATES PATENT OFFICE 2,585,676

AIRCRAFT WING AND FLAP WITH BOUNDARY LAYER CONTROL

Philippe Poisson-Quinton, Paris, France

Application July 29, 1948, Serial No. 41,213
In France July 31, 1947

7 Claims. (Cl. 244—40)

It is known that it has been already proposed to suck in and to blow out the boundary layer of air on the surface of airplane wings in order to intensify the circulation around the profile so as to put off the formation of eddies for the purpose of either increasing the lift, or diminishing the drag.

To this end a certain air volume is either blown out or sucked in through spanwise slots conveniently arranged in the airfoil profile, usually in the vicinity of both leading and trailing edges and in the gaps resulting from the presence of pivotable flaps.

This method has numerous advantages, namely:

It facilitates the taking off by increasing the lift and by diminishing the drag, and accessorily by delivering a supplementary thrust.

It contributes to development of an additional lift by making the air stream follow more closely the hyper-sustaining portions of the profile (i. e. the leading edge and the flaps).

It facilitates flight at top-speeds by elimination of the formation of eddies behind the impact wave and originated downstream of the middle-body.

It improves the efficiency of control surfaces, and particularly flaps.

The necessary air volume to be supplied per square meter of the surface, under a given pressure or under-pressure $\Delta p$, is, generally speaking, in a direct ratio with the airplane's speed. Thus the necessary energy constitutes an important portion of the propulsive power available on board (i. e., of the engine) and, taking into consideration the low value of $\Delta p$, the air volume to be supplied must be great.

In the conventional devices the discharge slot ducts are fed by a compressor, and the suction slot ducts are actuated by a suction generator. It is, however, difficult to confine the necessary suction and discharge ducts inside of wings of the modern airplanes, and on the other hand the pressure or suction generators, be they lodged in the wings or in the fuselage, are of a considerable size and are bulky.

The object of the present invention is to provide, in airfoil wing profiles, a combination of suction and discharge devices actuated by means of a blast nozzle inducing a greater volume of low pressure air than the amount of high pressure fluid injected therein. The air induced by the blast nozzle is collected upstream of the suction slots, and is blown out downstream through the discharge slots.

According to various embodiments of the invention this induction blast nozzle, as well as the suction and discharge slots, may have various construction particulars and may occupy various positions inside and on the surface of the airfoil.

As far as the structural particulars of the blast nozzle and of the slots are concerned, the invention may have various embodiments which follow:

According to a first embodiment of the invention, the blast induction nozzle has a spanwise cylindrical structure and comprises a flat mixing chamber in the median plane of which an inducing compressed air jet is injected through a nozzle or through continuous rectilineal slots. The suction slot, as well as the discharge slot, the latter being either connected by a deflector to the outlet of the flat mixing chamber, or being simply constituted by the terminal cross-section of said mixing chamber itself, are both continuous spanwise. This continuous structure in spanwise direction may be, however, interrupted, in case of constructive necessities, such as webs.

According to another embodiment of the invention, a plurality of small blasting nozzles distributed spanwise is used, the axes of said nozzles being directed crossways to the span, each nozzle acting, generally speaking, in a separate transverse airfoil portion limited sidewise by two planes parallel to the nozzle's axis and situated on each side of said nozzle; each of these separate portions is fed by a cylindrical induction blast nozzle connected to a high pressure duct running parallel to the longitudinal spars. In this case the discharge slot is constituted by flattened terminal cross-sections of mixing chambers cooperating with said nozzles, put in line and adjacent to each other, or is connected by some deflectors to said terminal cross-sections.

According to another embodiment of the invention, a plurality of small individual blasting nozzles is used, connected to a high pressure duct, the air being induced thereby in a single common mixing chamber as per the first above-mentioned embodiment.

Whichsoever the type of the blasting nozzle may be, a great velocity of blowing jet and a great efficiency of the device are obtained in giving such dimensions to the mixing chamber that the outlet section be smaller, or, at most, equal to the cross-section available for mixture in the plane perpendicular to the jet at the point of injection.

As far as the location of the blast nozzles inside of the airfoil, and the location of the slots on the surface and inside of the airfoil are concerned, the invention may have various embodiments which follow:

According to a first embodiment of the invention, the blast nozzle is located inside of the main airfoil; as to the suction slot, it may be situated either in the vicinity of the leading edge, or in a slit thereof swung hingedly downwards, or in a space constituting a split provided between the swingable leading edge when it is maintained in the upright position and the main airfoil body, or else between the main longitudinal spar and the trailing flap; the discharge slot is located in front of the trailing flap and is oriented in the rearward direction.

In the variants of this embodiment and which will be explained in the following detailed descriptions, a plurality of individual induction blast nozzles, or nozzles of so-called multiple type combined with serial mixing chambers, invariably located inside of the main airfoil profile, cooperate each with a suction slot and a discharge slot located in different manners on the airfoil surface; some of these slots may be common for several nozzles.

According to another embodiment of the invention, the blast nozzle is entirely lodged inside of a flap which is intermediate between the main airfoil and the trailing flap toward which the blast is directed, the suction slot being located at the break of said intermediate flap when it is hingedly swung down, or alternatively at a slit provided between the uprightly maintained intermediate flap and the main airfoil; as to the discharge slot, it is located at the break adjacent the front edge of the trailing flap.

According to one feature of this embodiment, the compressed air duct forming a flat blast nozzle, or the duct into which are set individual multiple type cylindrical nozzles, may serve at the same time as axis for pivoting of the intermediate flap containing the mixing chamber or chambers cooperating with the nozzles.

According to some variants of this latter embodiment, the suction is made simultaneously at two different spots, namely at the break of the intermediate flap (or in the slit provided therein), on the one hand, and at the break of the leading edge (or in the slit provided therein according to the first embodiment), on the other hand, the air sucked in in the vicinity of the leading edge flowing to the inducing member of the nozzle or nozzles through the apertures cut in the spars.

The devices according to the invention are applicable both to main sustaining airfoils of airplanes, and to auxiliary planes such as vertical or horizontal flaps.

Moreover, with a particular view to reducing the drag at high speeds, by acting upon the boundary layer, the devices according to the invention may be used on certain cross-sections of nacelles or fuselages, multiple type blast nozzles being arranged in a crown around the periphery of these cross-sections, or a single annular nozzle being fitted inside of said nacelles or fuselages.

The devices according to the invention will be more readily understood from the following detailed description referring to some particular examples chosen so as to show various possible embodiments, without restricting, however, the general scope of the invention. The description will be made with reference to the accompanying drawings in which.

Figure 1:
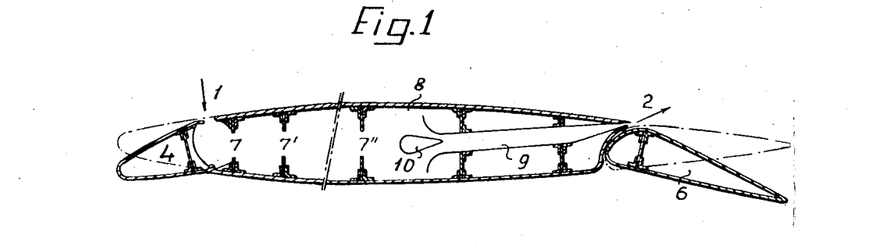
Figures 1 to 4 represent diagrammatically, in chordwise vertical section a device of a flat mixing chamber induced by a flat nozzle (extending continuously in spanwise direction), the whole device being lodged inside of an airfoil wing.

In Figure 1 the suction slot 1 is located at the break of the leading edge 4 swung downwards, and the air sucked in flows through the apertures 7, 7', 7" cut in the spars.

Figure 2:
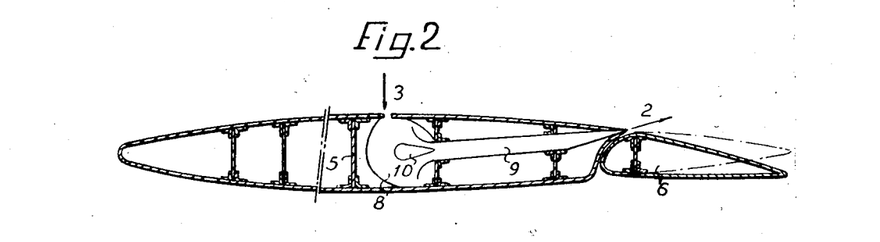

In Figure 2 the suction slot 3 is located between the main spar 5 and the trailing flap 6 of the airfoil. It has been explained that this slot may be either continuous, or interrupted along the span.

In both Figures 1 and 2 the discharge slot 2 is located in front of the trailing flap 6 and is facing toward the rear. This slot may also be continuous, or interrupted along the span.

Figure 3:
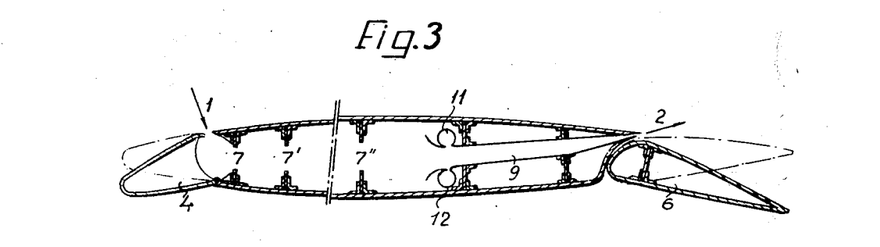
Figure 4:
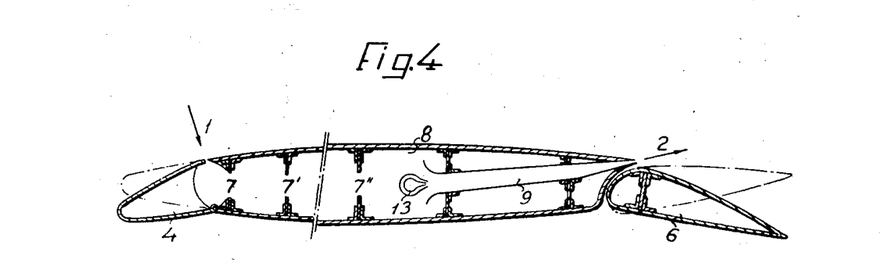

The air inducing device 8 is lodged inside of the main airfoil (Figures 1 to 4), and it draws the air flow from the suction slot to the discharge slot. As shown in Figs. 1 and 2, the air inducing device may extend continuously along the span, or it may be interrupted. The air inducing device comprises a cylindrical-convergent mixing blast pipe 9 and an induction blast nozzle 10 blowing in the median plane of the flat mixing chamber (or blast pipe) (Figures 1, 2); the induction blast nozzles may also be formed by tubular recesses 11 and 12 fitted in the walls of the mixing chamber and discharging thereto at a small angle (Figure 3).

Compressed air may be supplied by a duct connected with the compressor of a reaction engine. The induction blast nozzle 10 may also be fed with the exhaust gases of an airplane's engine. The nozzle may comprise two ducts 13 (Figure 4), one of which is fed by the exhaust gases, and the other, by compressed air. The devices according to Figures 1 and 3 may, of course, co-exist simultaneously, the axial nozzle 10 being fed by compressed air, and the tubular recesses 11 and 12 by exhaust gases, or vice versa.

Figure 5:
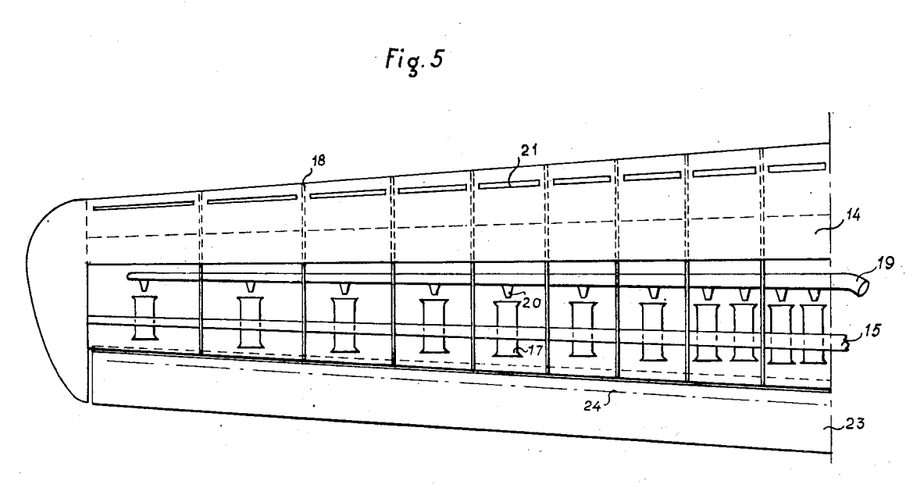
Figures 5 to 9 represent diagrammatically, in plan, in section and in detail elevation a device of multiple cylindrical, or cylindrical and flattened, blast pipes induced by individual cylindrical blast nozzles, as well as some constructional details of said device, the whole device being lodged inside of an airfoil wing.
Figure 6A:
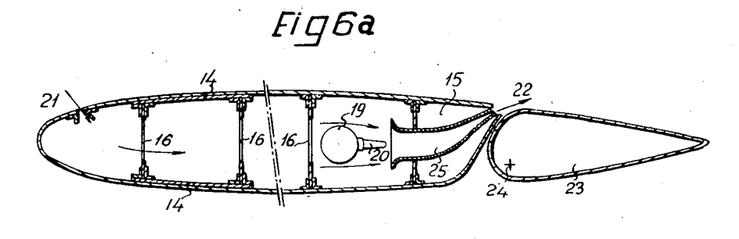
Figure 6B:
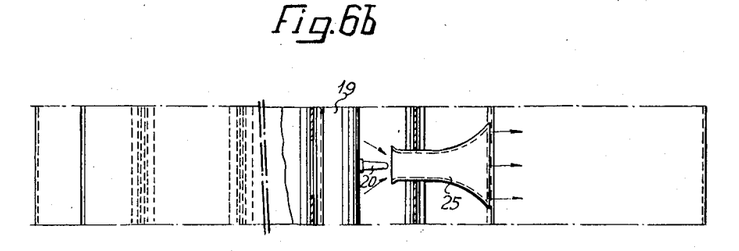

Figures 5, 6a, and 6b show a half-span wing comprising a forward box spar 14 and an ordinary flat aft spar 15. Apertures 16 are cut in these spars, so as to allow a circulation of air, or to hold the blast pipes 17 or 25. The spars are connected together by ribs 18.

A high pressure fluid duct 19 coming from the fuselage extends throughout the greater portion of the span, in parallel direction with the spars. The nozzles 20 are fitted in this duct, facing the cylindrical blast pipes 17, or the cylindrical-flattened blast pipes 25.

The whole wing is covered by a shell provided with suction slots 21 and with discharge slots 22 situated in extrados of the airfoil.

It is obvious that the same device is applicable in the same manner to the slots located in intrados, or to the slots located both in extrados and in intrados.

In the accompanying drawings the arrows show the circulation of air. Cylindrical, or more exactly very elongated truncated conical air deflectors may be placed in neighborhood of the slots, the generatrixes of which run in spanwise direction.

In a known manner this airfoil wing comprises, at the rim of the slot, a trailing flap 23, or a rudder, in case of a tail group. This flap or this rudder may comprise one single element and may be fitted with a slot, or may have several articulations. The slots may also be located in any place of the airfoil. In the examples shown the flap 23 is swingable around the hinge 24.

In each compartment comprised between the two neighbouring webs 18 the air induced by the nozzle 20 is sucked through the slot 21 and through the apertures 16 of the box spar 14, to be further blown out through the slot 22 into the free space left at the extrados between the main airfoil and the flap 23.

The air is blown directly out of the outlet of the mixing blast pipe 25. If this outlet does not constitute directly a discharge slot (which is the case in Figure 7), the air is to be guided from the outlet of the blast pipe towards the discharge slot by means of a deflector.

Figure 7:
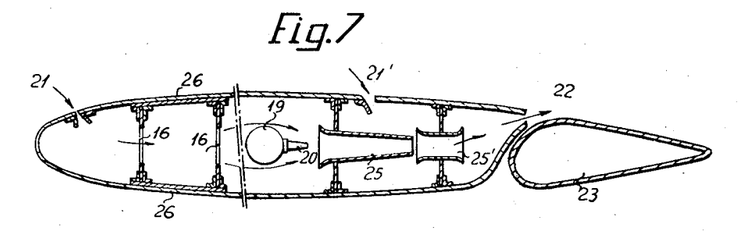

In the example of Figure 7, an airfoil wing is shown having a main box spar 26 and two auxiliary spars 27 and 27'. The inductor blast nozzle 20 and the blast pipe 25 suck the air through the slot 21 provided in the leading edge, and draw it through the apertures 16 of the spar 26. The blast pipe 25 serves, in its turn, as a nozzle to a second blast pipe 25', which sucks a complementary amount of air through the slot 21' in the extrados and blows it out through the discharge slot 22 in front of the flap 23.

Instead of induction nozzles 25, 25' of so called multiple type of Figure 7, two individual induction nozzles can be provided inside of the airfoil.

Figure 8:
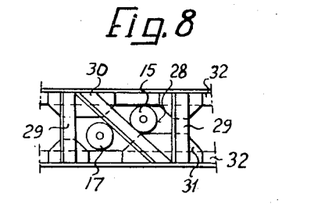

If the spars have a web-structure, as in the example shown in Figure 8, the induction blast nozzles 17 and 15 may be fitted in free spaces 28 between the stanchions 29, the diagonals 30 and the gussets 31 which unite the two soles 32 of this spar.

Figure 9:
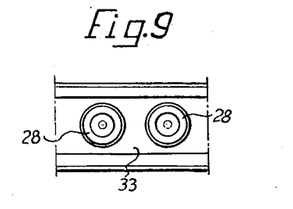

In case of a solid web of a full spar 33, as shown in Figure 9, the apertures for fitting in the nozzles, or the passage apertures 28 are simply cut in this web, and the rims of the apertures may be bent or reinforced by additional bands.

The examples of embodiments which have just been described show that the devices according to the invention may be very easily applied to the conventional structures of aircraft constructions.

In fact, a trapezoidal wing has, in a plan view, a chordwise depth which increases gradually toward the wing root. For an equal span fraction of the wing, the necessary air volume for suction or for blowing increases in the same ratio; therefore larger sized nozzles, or a greater number of nozzles are needed nearer the wing root. There is no difficulty in lodging the same, as, generally speaking, the relative thicknesses, and very often also the absolute thicknesses, increase in nearing the wing root.

This proportioning of sizes to the airfoil profile concerns also the duct 19 which is feeding in parallel arrangement all the successive nozzles and which has preferably a cross-section decreasing towards the wing's tips.

It is also possible to complete the adjustment of air deliveries to the required amounts by arranging the spacings of the nozzles, as shown in Figures 5. In the neighbourhood of the wing's root the nozzles are relatively close together, so that several nozzles may be lodged in one single compartment comprised between two ribs. On the contrary, towards the wing's tip there is only one nozzle between two ribs, the latter being, moreover, more widely spaced.

The guiding deflectors, if any, can advantageously serve as longitudinal reinforcements of the shell, and in their respective regions they substitute themselves for conventional stiffeners.

The nozzles are supported by the spars, or else by the longitudinal stiffeners.

At last, an airtight longitudinal sectioning is very easily obtainable by using the ribs.

In the example shown in Figures 6a and 6b it is not, however, necessary that sectioning be airtight, at least in the aft portion.

From the above description it is evident that the addition of a sucking and blowing device, according to the invention, to airfoil wings designed according to up-to-date principles, consists only in placing inside of these wings a conduit and blast nozzles, the other members of the device being generally present in a conventional wing.

Figure 10:
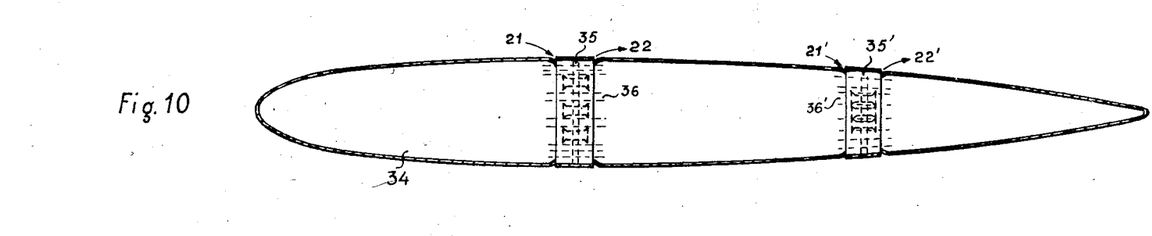
Figures 10 and 11 show diagrammatically, in axial section and in detail section, a combination of suction and discharge devices acutated by induction blast nozzles, as applied to a fuselage surface.

This sucking and blowing device is also applicable to a nacelle or a fuselage, such as shown at 34 in Figure 10.

In this example two frames 35 and 35' are shown, located in the plane of two ribs of the fuselage, these frames being stiffened by stringers 36 which divide them into longitudinal compartments or cells. Suction slots 21 or 21' are provided, thanks to this arrangement, upstream of the rib, and discharge slots 22 or 22', downstream of the rib.

Figures 11, 12, 13:
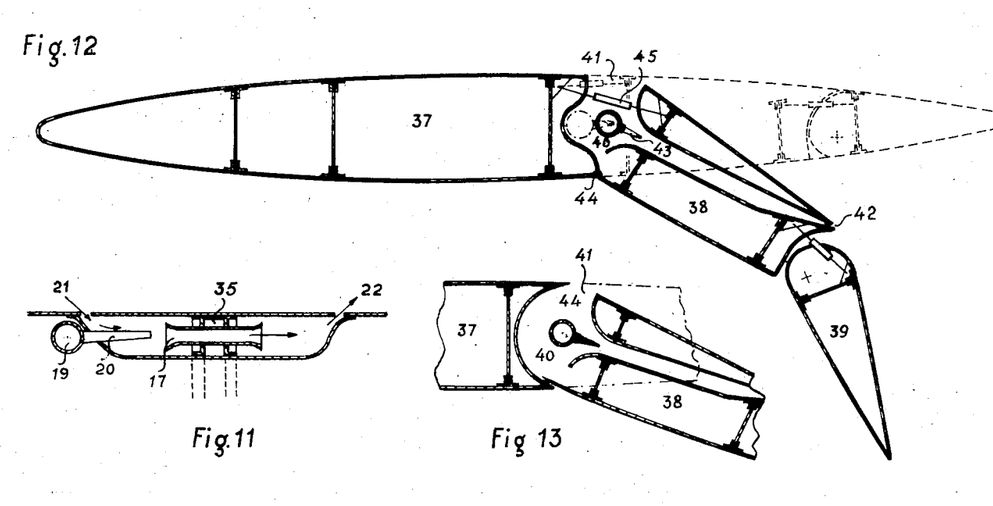
Figures 12 to 14 show diagrammatically, in chordwise vertical section, a combination of suction and discharge devices actuated by induction blast nozzles lodged inside of a flap intermediate between the main airfoil and the trailing flap.

In the detail section on a larger scale shown in Figure 11 it is seen that the blast pipes are supported by the frame 35 which plays a role similar to that of a wing's spar; it will also be seen that they are fed by an annular pipe 19 fitted with the blast nozzles 20. On the other hand, the stringers of the fuselage provide for the same sectioning of the cells, as do the ribs in the wings.

In Figure 12 the airfoil profile comprises a main portion 37, a first flap 38, and a second flap 39. According to the invention, the air inducing device which performs the suction and the blowing out, is entirely lodged inside of the flap 38. The suction slot 41 is located at the break of the first flap, and the discharge slot is located at the break of the second flap. This arrangement makes it possible to obtain a closer flow of the air streams along both the flaps, which gives to the airfoil profile a maximum efficiency of the hyper-sustaining effect resulting from the curvature of its median line.

On the other hand, in a manner advantageous for constructional reasons, the compressed air or exhaust gas pipe 40, into which are fitted the blast nozzles 43 (or is fitted a flat blast nozzle which will be described with reference to Figure 16b) may serve at the same time as axis of rotation of the flap 38 relatively to the main airfoil portion 37, as shown in Fig. 13. In order to avoid a distortion of the blowing device when the flap 38 is swung down, the pipe 40 is arranged in such a manner that it turns around its axis, so as to follow the rotation of the flap 38.

If it is preferred, from the point of view of tightness of high pressure connections, that the pipe does not turn about its own axis, contrary to what is shown in Figure 13, the flap 38 will pivot relatively to the main airfoil profile around a hinge 44, which is distinct from the axis of the pipe 40, as shown in Figure 12.

The members 45 and 45' (Figure 12) are hydraulical or mechanical screw-jacks for swinging the flaps 38 and 39, which screw-jacks are not specific of the invention.

Figures 14, 15, 16A, 16B, 16C, 17:
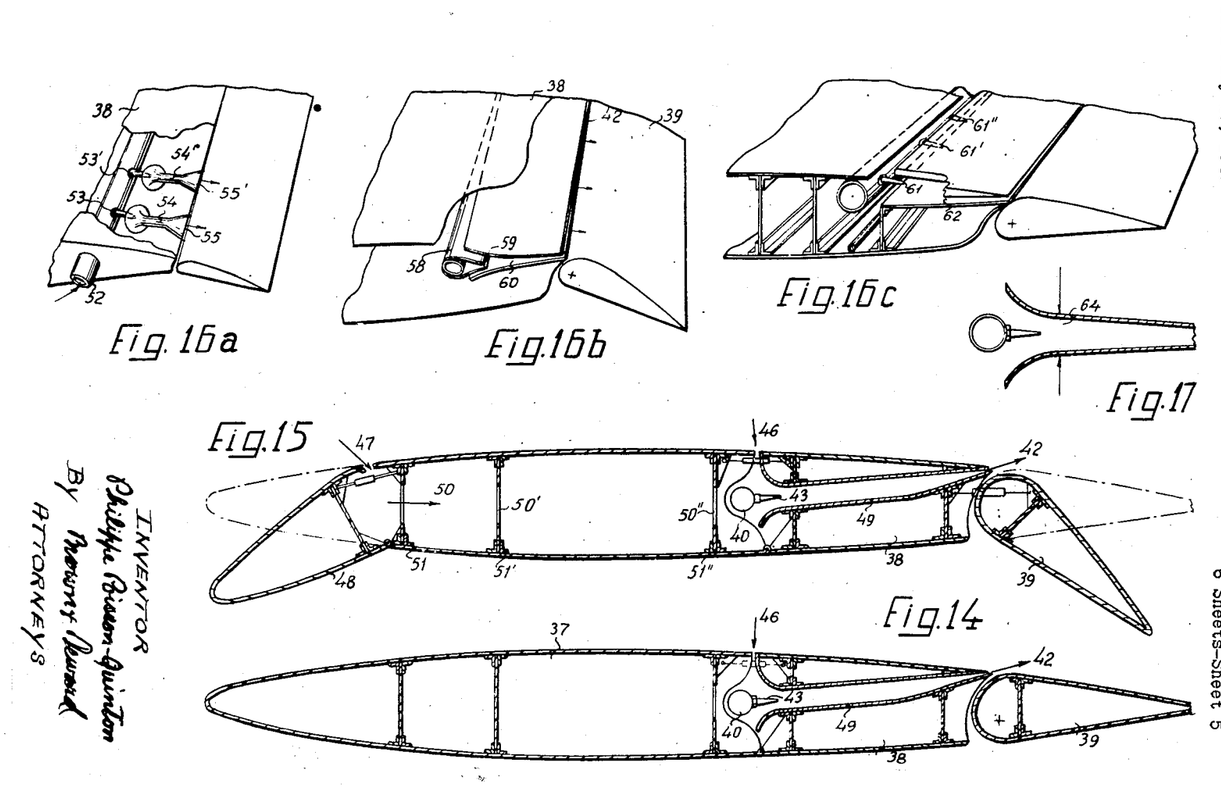
Figure 15 shows a device similar to that of the preceding figure, but cooperating with a second suction slot provided in the leading edge.
Figures 16a, 16b, and 16c give in perspective details of several models of induction blast nozzles lodged in an intermediate flap and combined either with a common flat mixing chamber, or with individual mixing blast pipes.
Figure 17 shows a cross-section of an induction blast nozzle in a plane perpendicular to the span.
Figure 18:
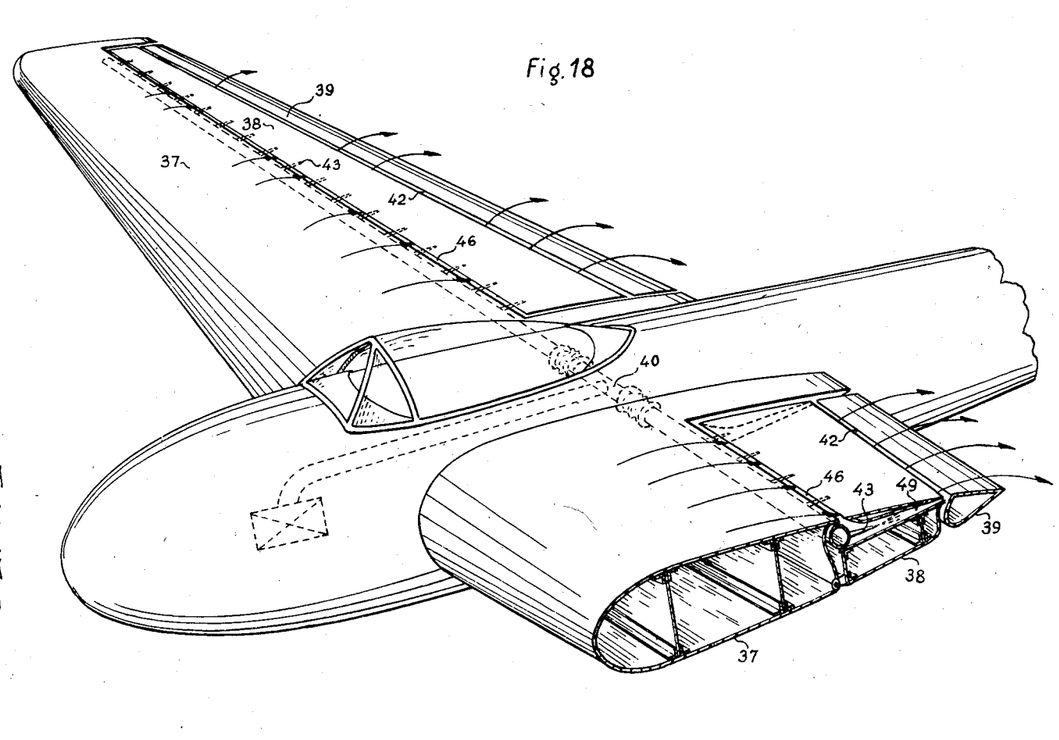
Figure 18 represents, in perspective and partly in section, an airplane constructed according to Figs. 12 to 14.

Figure 14 shows the same airfoil profile as in Figures 12 and 13, but having their flaps 38 and 39 maintained in an upright position. In this position it is, however, possible to obtain a suction and a blowing, by leaving a certain play between the main section and the flap 38, so as to allow for the suction to take place through the suction slot shown at 46. This arrangement serves to prevent the air streams at top-speeds, from breaking off in eddies behind the impact wave forming itself downstream of the middle-body of the profile at these speeds. This device also makes it possible, during the taking off manoeuvre, to obtain an increase of lift, a diminution of drag, and a supplement of thrust, the blast nozzles being then put into connection with a special gas generator, or with a compressor of a turbo-reaction engine, or else with the exhaust of the motor.

Figure 15 shows an airfoil profile similar to those of Figs. 12 to 14, but being provided with a swingable leading edge 48. According to the invention the suction made in 46, as in Figure 14, is combined with the suction made in 47, at the break of the leading edge 48. The air sucked in at 47 flows through the apertures 50, 50', 50'', cut in the spars 51, 51', 51'', and arrives at the inlet of the mixing chambers or blast pipes 49. This arrangement increases the efficiency of the leading edge from the point of view of hyper-sustaining effect.

Figures 16a, 16b and 16c show various types of blowing devices lodged in the intermediate flap. Fig. 16a is a type similar to that of Figures 6a and 6b, and in which 52 is the compressed air pipe, serving at the same time as rotation axis of the flap 38. 53 and 53' are the cylindrical blast nozzles fitted to the compressed air pipe 52. 54 and 54' are the mixing blast pipes the outlets 55 and 55' of which are flattened and placed together to form the discharge slot 42.

Figure 16b shows a flat blast nozzle of a generally cylindrical shape extending spanwise, of a type similar to that of Figures 1 to 4. 56 is the compressed air pipe provided with a slit 57 parallel to its axis. This pipe comprises a deflecting plate 58 which may also be composed of two pieces and which forms a flat rectilineal blast nozzle 59. The slit 57 and the deflector 58 are interrupted over the location of ball bearings of articulation of the flap 38, if the latter is articulated on 56. The flat mixing chamber is represented at 60, and its outlet constitutes the discharge slot 42.

Figure 16c shows a type of blowing device wherein the multiple type cylindrical blast nozzles 61, 61', 61'', of a type shown in Figure 16a, are cooperating with a flat mixing chamber 62 of a type shown in Figure 16b. When the compressed air pipe forms an axis of rotation, it can be arranged that the pipe follows the rotation of the flap 38, so as to maintain the blast nozzles in a convenient position relatively to the mixing chamber.

According to the invention, a great speed of the blowing jet and a high efficiency of the system are obtained in adjusting the proportions of the mixing chamber in such a manner that the cross-section of the passage 63 of the discharge slot be smaller or, at most, equal to the cross-section of the passage 64 available for the mixture at the level of the blast nozzle.

What I claim is:

1. In an aircraft wing comprising a main body and pivotal leading and trailing sections whereby the camber of the wing can be varied, the upper surfaces of said sections defining with the upper surface of said main body at least one air suction slot which is variable as the corresponding section is moved to vary the camber of the wing, an air blowing slot formed at the upper rear portion of a trailing section, a spanwise directed pipe below the air suction slot defined by said main body and said trailing section, a plurality of rearwardly directed air induction blast nozzles disposed along the length of said pipe, a chamber formed within said trailing section and establishing communication between said suction and blowing slots, and means for supplying a fluid under pressure to said pipe and thereby producing an aspirating effect by said nozzles for causing a sheet of air to be drawn in through said suction slot and discharged through said blowing slot.

2. In an aircraft wing comprising a main body, a first pivotal flap adjacent to and having substantially same length as the trailing edge of said main body, a second pivotal flap adjacent to the trailing edge of said first flap, an air suction slot formed between the upper surface of said main body and the upper surface of said first flap so as to be variable in area as said first flap is moved to vary the camber of the wing, an air blowing slot formed in the upper rear portion of said first flap, a spanwise directed pipe below said air suction slot and carried by said first flap so as to be perpendicular to the fore-and-aft axis thereof, a plurality of rearwardly directed air induction blast nozzles fixed along the length of said pipe in regular spaced relationship one to the others, a mixing chamber formed within said first flap and establishing communication between said suction and blowing slots, and means for supplying a fluid under pressure to said pipe and thereby producing an aspirating effect by said nozzles for causing a sheet of air to be drawn in through said air suction slot and discharged through said air blowing slot to flow over the upper surface of said second flap.

3. In an aircraft wing comprising a main body, a first trailing flap pivoted to said main body, a second trailing flap pivoted to said first flap, an air suction slot formed between the upper surface of said main body and the upper surface of said first flap, said surfaces being so disposed as to increase the area of the slot as the wing camber increases, an air flow-discharge slot formed in the upper rear portion of said first trailing flap, a spanwise extending suction chamber disposed below said suction slot and in communication with the same, a spanwise extending pipe within said suction chamber, a plurality of rearwardly directed air induction blast nozzles fixed on said pipe along the length thereof, a mixing chamber within said first trailing flap formed by two surfaces converging at one end to said discharge slot and divering at the other end to form said suction chamber, and means for supplying a fluid under pressure to said pipe and thereby producing an aspirating effect by said nozzles for causing a sheet of air to be drawn in through said air suction slot and discharged through said air discharge slot.

4. In an aircraft wing comprising a main body, a first trailing flap pivoted to said main body, a second trailing flap having a semi-circular shaped leading edge pivoted to said first trailing flap, a variable air suction slot formed between the upper surface of said main body and the upper surface of said first flap, a rearwardly directed air flow-discharge slot formed at the upper rear portion of said first flap, a suction chamber below said suction slot, a spanwise directed pipe forming an integral part of said first trailing flap and extending within said suction chamber so as to be perpendicular to the fore-and-aft axis of said first flap, means for supplying a fluid under pressure to said pipe, a plurality of rearwardly directed air induction blast nozzles arranged to receive said fluid under pressure from said pipe, and a spanwise extending mixing chamber having its rear end formed by two surfaces leading to said air flow-discharge slot and its front end formed by two diverging surfaces forming said suction chamber, the fore-and-aft axis of said mixing chamber being tangential to said semi-circular shaped leading edge of said second flap.

5. In an aircraft wing comprising a main body, a first trailing flap pivoted to said main body, a second trailing flap pivoted to said first trailing flap, a variable air suction slot formed between the upper surface of said main body and the upper surface of said first flap, a rearwardly directed air flow-discharge slot formed between the upper surface and the rear surface of said first flap, a suction chamber communicating with said suction slot, a mixing chamber formed within said first flap and establishing communication between said suction chamber and said discharge slot, said suction chamber being formed by two surfaces diverging from said mixing chamber, a spanwise directed pipe forming an integral part of said first trailing flap disposed within said suction chamber and adapted to form the pivot axis of said first trailing flap, a plurality of rearwardly directed air induction blast nozzles fixed on said pipe, and means for supplying a fluid under pressure to said nozzles through said pipe.

6. In an aircraft wing comprising a main body, a first trailing flap pivoted at its lower front portion to a lower rear portion of said main body, a variable slot formed between the upper surface of said first flap and the upper surface of said main body at a point opposite said pivotal connection, a second trailing flap pivoted to said first flap, a rearwardly directed air flow-discharge slot formed between the upper surface and the rear surface of said first flap, a spanwise extending mixing chamber formed within said first flap so as to merge with one end into said discharge slot, the other end of said mixing chamber being formed to provide a suction chamber communicating with said suction slot, a spanwise directed pipe movable with said first flap and disposed within said suction chamber, a plurality of rearwardly directed air induction blast nozzles fixed on said pipe, means for supplying a fluid under pressure to said nozzles through said pipe, and means to move said flaps about their pivot axes to vary the camber of the wing.

7. A pivotal trailing edge flap for use in connection with aircraft wings, comprising a spanwise extending and rearwardly directed air flow discharge slot formed between the upper surface and the rear surface of said flap, a spanwise extending pipe mounted at the front portion of said flap so as to be perpendicular to the fore-and-aft axis thereof, said pipe being adapted to receive a fluid under pressure, a plurality of rearwardly directed air induction blast nozzles mounted along the length of said pipe and arranged to receive said fluid under pressure from said pipe, a spanwise extending mixing chamber formed within said flap and having one end arranged to merge into said discharge slot and its other end arranged to diverge to a funnel at the location of said nozzles, the front portion of said flap having a lower part adapted to be hinged to said wing and an upper part adapted to define an air suction slot with the upper surface of said wing when said lower part is connected to the wing while the rear portion of said flap is adapted to receive a second pivotal trailing flap.

PHILIPPE POISSON-QUINTON.

REFERENCES CITED

The following references are of record in the file of this patent:

UNITED STATES PATENTS

| Number | Name | Date |
|---|---|---|
| 1,725,914 | Hallowell | Aug. 27, 1929 |
| 2,277,175 | Wagner | Mar. 24, 1942 |
| 2,348,253 | Griswold | May 9, 1944 |
| 2,390,161 | Mercier | Dec. 4, 1945 |
| 2,406,919 | Stalker | Sept. 3, 1946 |
| 2,453,721 | Mercier | Nov. 16, 1948 |
| 2,463,864 | Gibson | Mar. 8, 1949 |
| 2,496,565 | Stalker | Feb. 7, 1950 |
| 2,517,524 | Beck | Aug. 1, 1950 |

FOREIGN PATENTS

| Number | Country | Date |
|---|---|---|
| 484,405 | Great Britain | May 2, 1938 |
| 491,483 | Great Britain | Sept. 2, 1938 |
| 296/28 | Australia | May 23, 1929 |